United States Patent
Ahmed et al.

(10) Patent No.: US 9,774,354 B2
(45) Date of Patent: Sep. 26, 2017

(54) GENERATION OF CORRELATED FINITE ALPHABET WAVEFORMS USING GAUSSIAN RANDOM VARIABLES

(71) Applicant: King Abdullah University of Science and Technology, Thuwal (SA)

(72) Inventors: Sajid Ahmed, Thuwal (SA); Mohamed Slim Alouini, Thuwal (SA); Seifallah Jardak, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/751,916

(22) Filed: Jun. 26, 2015

(65) Prior Publication Data

US 2016/0013819 A1 Jan. 14, 2016

Related U.S. Application Data

(60) Provisional application No. 62/022,832, filed on Jul. 10, 2014.

(51) Int. Cl.
*H04B 1/04* (2006.01)
*H04B 7/06* (2006.01)
(Continued)

(52) U.S. Cl.
CPC ............ *H04B 1/0475* (2013.01); *G01S 13/26* (2013.01); *G01S 13/325* (2013.01);
(Continued)

(58) Field of Classification Search
CPC .. H04B 7/0617; H04B 7/0408; H04B 7/0413; H04L 27/36; H04L 27/362
See application file for complete search history.

(56) References Cited

U.S. PATENT DOCUMENTS 6,185,259 B1* 2/2001 Dent ................... H04L 1/0054
332/100
2007/0206504 A1* 9/2007 Koo .................... H04B 7/0408
370/245

(Continued)

OTHER PUBLICATIONS

Seifallah Jardak, Sajid Ahmed and Mohamed-Slim Alouini "Generating Correlated QPSK Waveforms by Exploiting Real Gaussian Random Variables", University of Carthage La Marsa, Tunisia, King Abdullah University of Science and Technology Thuwal, Saudi Arabia, 2012, IEEE.*

(Continued)

*Primary Examiner* — Aristocratis Fotakis
(74) *Attorney, Agent, or Firm* — Thomas | Horstemeyer LLP; Todd N. Deveau; Randy R. Schoen

(57) ABSTRACT

Various examples of methods and systems are provided for generation of correlated finite alphabet waveforms using Gaussian random variables in, e.g., radar and communication applications. In one example, a method includes mapping an input signal comprising Gaussian random variables (RVs) onto finite-alphabet non-constant-envelope (FANCE) symbols using a predetermined mapping function, and transmitting FANCE waveforms through a uniform linear array of antenna elements to obtain a corresponding beampattern. The FANCE waveforms can be based upon the mapping of the Gaussian RVs onto the FANCE symbols. In another example, a system includes a memory unit that can store a plurality of digital bit streams corresponding to FANCE symbols and a front end unit that can transmit FANCE waveforms through a uniform linear array of antenna elements to obtain a corresponding beampattern. The system can include a processing unit that can encode the input signal and/or determine the mapping function.

20 Claims, 9 Drawing Sheets

(51) Int. Cl.
*H04L 27/36* (2006.01)
*G01S 13/26* (2006.01)
*G01S 13/32* (2006.01)
*G01S 7/35* (2006.01)
*G01S 7/32* (2006.01)

(52) U.S. Cl.
CPC ............ *H04B 7/0617* (2013.01); *H04L 27/36* (2013.01); *G01S 7/32* (2013.01); *G01S 2007/356* (2013.01)

(56) References Cited

U.S. PATENT DOCUMENTS

| | | | | |
|---|---|---|---|---|
| 2010/0122145 | A1* | 5/2010 | Murakami | H03M 13/255 714/762 |
| 2013/0251057 | A1* | 9/2013 | Hamila | H04L 27/2646 375/260 |
| 2013/0272462 | A1* | 10/2013 | Siti | H04B 7/0413 375/341 |

OTHER PUBLICATIONS

Chengshan Xiao, Yahong Rosa Zheng and Zhi Ding "Globally Optimal Linear Precoders for Finite Alphabet Signals Over Complex Vector Gaussian Channels", Missouri University of Science and Technology, University of California, USA, IEEE, Jul. 2011.*

Weiliang Zeng, Chengshan Xiao, Mingxi Wang, and Jianhua Lu, Linear Precoding for Finite-Alphabet Inputs Over MIMO Fading Channels With Statistical CSI, Tsinghua University, China, Missouri University of Science and Technology, 2012, IEEE.*

EP15175628 search report from related application mailed Nov. 12, 2015.

Jardak, Seifallah, Colocated MIMO Radar: Transmit Beamforming, Waveform Design, and Target Parameter Estimation, In Partial Fulfillment of the Requirements for the Degree of Master of Science in Electrical Engineering, Apr. 2014, Retrieved from the Internet:URL:http://repository.kaust.edu.safkaust/bitstream/10754/317255/1/ThesisSeifallahJardak.pdf.

Ahmed, Sajid et al., Finite Alphabet Constant-Envelope Waveform Design for MIMO Radar, IEEE Transactions on Signal Processing, vol. 59, No. 11, Nov. 2011.

GC Patent Application 2015/29719 filed on Jul. 9, 2015, Office Action mailed Aug. 23, 2016.

Y. Dong, L. Rosenberg, and G. V. Weinberg, "Generating correlated Gamma sequences for sea-clutter simulation," Tech. Rep., Mar. 2012.

P. Stoica, J. Li, and Y. Xie, "On probing signal design for MIMO radar," IEEE Transactions on Signal Processing, vol. 55, No. 8, pp. 4151-4161, Aug. 2007.

E. Fishier, A. Haimovich, R. Blum, D. Chizhik, L. Cimini, and R. Valenzuela, "MIMO radar: An idea whose time has come," in Proceedings of the IEEE Radar Conference, 2004, Apr. 2004, pp. 71-78.

E. Fishier, A. Haimovich, R. Blum, L. Cimini, D. Chizhik, and R. Valenzuela, "Spatial diversity in radars—models and detection performance," IEEE Transactions on Signal Processing, vol. 54, No. 3, pp. 823-838, 2006.

A. Haimovich, R. Blum, and L. Cimini, "MIMO radar with widely separated antennas," IEEE Signal Processing Magazine, vol. 25, No. 1, pp. 116-129, 2008.

J. Li and P. Stoica, "MIMO radar with colocated antennas," IEEE Signal Processing Magazine, vol. 24, No. 5, pp. 106-114, Sep. 2007.

D. Fuhrmann and G. San Antonio, "Transmit beamforming for MIMO radar systems using signal cross-correlation," IEEE Transactions on Aerospace and Electronic Systems, vol. 44, No. 1, pp. 171-186, Jan. 2008.

P. Stoica, J. Li, and X. Zhu, "Waveform synthesis for diversity-based transmit beampattern design," IEEE Transactions on Signal Processing, vol. 56, No. 6, pp. 2593-2598, Jun. 2008.

J. Brown, J., "On the expansion of the bivariate Gaussian probability density using results of nonlinear theory (corresp.)," IEEE Transactions on Information Theory, vol. 14, No. 1, pp. 158-159, Jan. 1968.

J. Robinson and Y. Rahmat-Samii, "Particle swarm optimization in electromagnetics," IEEE Transactions on Antennas and Propagation, vol. 52, No. 2, pp. 397-407, Feb. 2004.

Fuhrmann, Daniel R., J. Paul Browning, and Muralidhar Rangaswamy. "Signaling strategies for the hybrid MIMO phased-array radar." IEEE Journal of Selected Topics in Signal Processing 4.1 (Feb. 2010): 66-78.

* cited by examiner

GENERATION OF CORRELATED FINITE ALPHABET WAVEFORMS USING GAUSSIAN RANDOM VARIABLES

CROSS REFERENCE TO RELATED APPLICATIONS

This application claims priority to, and the benefit of, U.S. provisional application entitled "Generation of Correlated Finite Alphabet Waveforms Using Gaussian Random Variables" having Ser. No. 62/022,832, filed Jul. 10, 2014, which is hereby incorporated by reference in its entirety.

BACKGROUND

Correlated waveforms or random variables (RVs) are utilized in a number of fields. For example, in communications the noise at different receive antennas can be correlated (colored). Similarly depending on the radar parameters and sea surface conditions, each component of the received sea clutter may be correlated. In both of these applications, correlated RVs are generated for simulations. Therefore, generation of such waveforms is not challenging. Software radar is an emerging technology, where characteristics of radar, such as beampattern, signal to interference plus noise ratio (SINR), and side-lobe-levels (SLLs), can be changed through software without changing any hardware. This technology requires the design of correlated waveforms. To use such waveforms in practice, their peak-to-average power ratio (PAPR) should be close to unity and the symbols of the waveform should be drawn from finite alphabets. Generation of such waveforms is very challenging.

SUMMARY

The present disclosure is related to generation of correlated finite alphabet waveforms using Gaussian random variables. In one or more aspects, Gaussian random variables (RVs) are mapped onto finite-alphabet non-constant-envelope (FANCE) symbols using a mapping function. In one or more aspects, FANCE waveforms are transmitted through a uniform linear array of antenna elements to obtain a corresponding beampattern. The FANCE waveforms can be based upon a mapping of the Gaussian RVs onto the FANCE symbols. One or more aspects can be utilized in radar and/or communications applications (e.g., transmitters or transceivers).

In an embodiment, a method is provided that comprises mapping an input signal comprising Gaussian random variables (RVs) onto finite-alphabet non-constant-envelope (FANCE) symbols using a predetermined mapping function, and transmitting FANCE waveforms are transmitted through a uniform linear array of radar antenna elements to obtain a corresponding beampattern. The FANCE waveforms can be based upon the mapping of the Gaussian RVs onto the FANCE symbols. The method can be implemented using a processing device.

In an embodiment, a system is provided that comprises a memory unit configured to store a plurality of digital bit streams corresponding to finite-alphabet non-constant-envelope (FANCE) symbols synthesized by mapping an input signal comprising Gaussian random variables (RVs) onto the FANCE symbols using a predetermined mapping function, and a front end unit configured to transmit FANCE waveforms through a uniform linear array of antenna elements to obtain a corresponding beampattern. The FANCE waveforms can be based upon the mapping of the Gaussian RVs onto the FANCE symbols.

In any one or more aspects of the method or the system, the mapping can be based upon M equiprobable regions of the Gaussian RVs. The Gaussian RVs can be real Gaussian RVs and/or complex Gaussian RVs. The FANCE symbols can correspond to M-PAM (pulse-amplitude modulation) symbols and/or the FANCE symbols correspond to M-QAM (quadrature-amplitude modulation) symbols. The system can also comprise a processing unit. The input signal can be encoded onto the FANCE symbols using the predetermined mapping function, e.g., by the processing unit. The predetermined mapping function can be based at least in part upon a covariance matrix corresponding to the corresponding beampattern. The processing unit can also be configured to synthesize the covariance matrix corresponding to the corresponding beampattern. The front end unit can be configured to convert the each bit stream is configured to convert the plurality of digital bit streams into corresponding IQ data streams. The front end unit can be a radar front end unit that can be configured to transmit FANCE waveforms through a uniform linear array of radar antenna elements.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
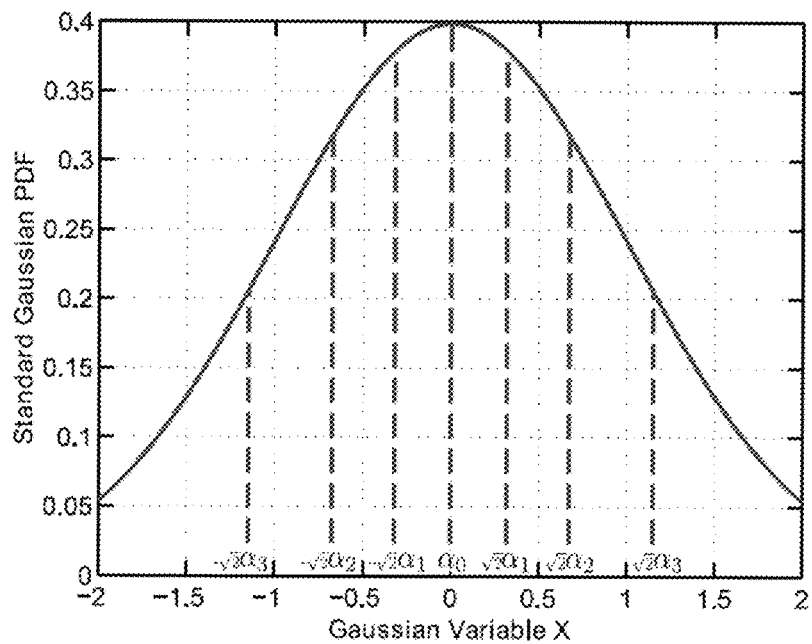
FIG. 1 is a plot illustrating an example of a Gaussian probability distribution function (PDF) divided into equiprobable regions in accordance with various embodiments of the present disclosure.

Disclosed herein are various examples related to the generation of correlated finite alphabet waveforms. Reference will now be made in detail to the description of the embodiments as illustrated in the drawings, wherein like reference numbers indicate like parts throughout the several views.

In multiple-input multiple-output (MIMO) communication systems, multiple antennas are deployed at the transmitter and receiver to increase the data rate and provide multiple paths to mitigate the fading in the channel. Like MIMO communications, MIMO techniques can be applied to radar systems. MIMO radars offer extra degrees-of-freedom (DOF), which can be exploited for more diversity, higher spatial resolution, reduced side-lobe-levels at the receiver, and in order to design a variety of desired transmit beampatterns. Depending on how the antennas are distributed, MIMO radars can be classified into two categories: widely distributed and collocated. In widely distributed cases, the transmitting antennas are widely separated so that each antenna may view a different aspect of the target. This topology can increase the spatial diversity of the system. In contrast, the transmitting antennas in collocated systems are closely spaced to view the same aspect of the target. The collocated antenna does not provide spatial diversity, but can increase the spatial resolution of the radar system. Moreover, compared to phased-array radars, collocated radars can provide better control of the transmit beampattern.

Correlated waveforms have a number of applications in different fields, such as radar and communication. Correlated waveforms using infinite alphabets can be easily generated, but for some of the applications, it can be very challenging to use them in practice. In contrast to correlated noise and sea clutter modeling, generated waveforms in MIMO radar have to satisfy some constraints so that they can be used in practice. To generate infinite alphabet constant envelope correlated waveforms, conventional methods use iterative algorithms, which are computationally very expensive and the generated waveforms may have infinite alphabets.

In this disclosure, various methods will be discussed to generate correlated waveforms using finite alphabet constants and non-constant-envelope symbols. To generate finite alphabet waveforms, the Gaussian random variables (RVs) can be mapped onto the phase-shift-keying modulation (PSK), pulse-amplitude modulation (PAM), and quadrature-amplitude modulation (QAM) schemes. For such mapping, the probability-density-function of Gaussian RVs can be divided into M regions, where M is the number of alphabets in the corresponding modulation scheme. By exploiting the mapping function, the relationship between the cross-correlation of Gaussian and finite alphabet symbols is derived. To generate equiprobable symbols, the area of each region is kept the same. Each symbol can have its own unique probability. Finite alphabet waveforms can be generated for MIMO radar, where correlated waveforms are used to achieve desired beampatterns.

Generally, the design of correlated waveforms for the desired transmit beampattern relies on a two-step process. In the first step, a covariance matrix of the waveforms is synthesized for a desired beampattern, while in the second step actual waveforms are designed to realize the covariance matrix. To design waveforms, the constant envelope constraint may be relaxed by allowing small variations in the amplitudes of the waveforms while satisfying a low peak-to-average power ratio (PAPR) constraint. Even though these methods give good performance in terms of mean-squared-error (MSE), it is challenging to use these waveforms in practice.

Low complexity alternative solutions can be used to generate correlated finite-alphabet constant-envelope (FACE) and finite-alphabet non-constant-envelope (FANCE) waveforms. Correlated Gaussian RVs can be easily generated and memoryless non-linear functions can be used to map the Gaussian RVs onto the FACE or FANCE waveforms. The relationship between the cross-correlation of Gaussian and finite alphabet symbols is developed. A general closed form solution is presented for the generation of higher order correlated waveforms such as M-phase-shift-keying (M-PSK), M-pulse-amplitude-modulation (M-PAM), and M-quadrature-amplitude-modulation (M-QAM). Although, this disclosure focuses on the generation of equiprobable symbols, generation of symbols with different specified probabilities is possible.

The general relationship between the cross-correlation of Gaussian and finite alphabet RVs will first be derived. Based upon this relationship, real Gaussian RVs can be mapped onto the M-PSK waveforms to generate FACE waveforms. Using different mapping functions, real Gaussian RVs can be mapped onto M-PAM waveforms to generate FANCE waveforms and complex Gaussian RVs can be mapped onto M-QAM waveforms, which can approximate the non-symmetric beampatterns. In addition, the performance of the various modulation schemes, along with simulation results, will be presented.

The following properties of matrix algebra will be used throughout this discussion. Bold upper case letters, X, and lower case letters, x, respectively denote matrices and vectors. Transposition and conjugate transposition of a matrix are denoted respectively by $(\bullet)^T$ and $(\bullet)^H$, while statistical expectation is denoted by $E\{\bullet\}$.

Theorem 1: If A and B are two positive semidefinite matrices, then the matrix C=A+B is guaranteed to be positive semidefinite. Note that this is not the case for the matrix D=A−B.

Theorem 2: If A is a positive semidefinite matrix, then its p times Schur product, i.e. $(A)^p$ is also positive semidefinite.

Closed and open intervals of numbers between a and b are respectively denoted by [a, b] and ]a, b[. The real, imaginary and absolute value of a complex variable x are respectively represented by $\Re(x)=x_R$, $\Im(x)=x_I$ and, |x|. Whereas, the binomial coefficient is denoted $$by \binom{n}{k} = \frac{n!}{k!(n-k)!}.$$

Usually, the desired beampattern is used to maximize the transmitted power in the region of interest, and minimize the transmitted power in all other directions. To achieve this, a uniform linear array of N antenna elements with half wavelength inter-element spacing can be used. Let $x_n(l)$ be the baseband signal transmitted from antenna n at time index l. The received baseband signal at location $\theta_k$ can be defined as:

$$r_k(l) = \sum_{n=1}^{N} e^{-j(n-1)\pi \sin(\theta_k)} x_n(l), \quad l=1,2,\ldots,L, \qquad (1)$$

where L denotes the total number of symbols transmitted from each antenna. By defining the vectors $e(\theta_k) = [1 \ e^{j\pi \sin(\theta_k)} \ \ldots \ e^{j(N-1)\pi \sin(\theta_k)}]^T$ and $x(l) = [x_1(l) x_2(l) \ldots x_N(l)]^T$, EQN (1) can be written in vector form as:

$$r_k(l) = e^H(\theta_k) x(l). \qquad (2)$$

Thus, the received power at location $\theta_k$ is expressed as follows:

$$P(\theta_k) = E\{e^H(\theta_k) x(l) x^H(l) e(\theta_k)\} = e^H(\theta_k) R e(\theta_k) \qquad (3)$$

where R is the correlation matrix of the transmitted waveforms. To achieve the desired beampattern $\phi(\theta)$, the covariance matrix R should minimize the following constrained problem:

$$\min_{R,\alpha} \frac{1}{K} \sum_{k=1}^{K} (e^H(\theta_k) R e(\theta_k) - \alpha \phi(\theta_k))^2, \qquad (4)$$

$$\text{subject to:} \quad \begin{array}{l} v^H R v \geq 0, \quad \text{for all } v \\ R(n,n) = c, \quad \text{for } m = 1, 2, \ldots, N, \end{array}$$

where K is the number of subdivisions of the region of interest, $\alpha$ is a weighting factor and c is the transmitted power from each antenna. Since the matrix R is a covariance matrix, it should be a positive semidefinite and the first constraint is straightforward. The second constraint should be satisfied to use the same power amplifier for each antenna and achieve maximum power efficiency. In addition, depending on the symmetry of the desired beampattern, $\phi(\theta)$, the designed covariance matrix R can contain real or complex elements.

Once R is synthesized, the waveform matrix $X = [x_1 x_2 \ldots x_N]$ can be easily generated using Gaussian RVs as follows:

$$X = X \Lambda^{1/2} W^H, \qquad (5)$$

where $X \in C^{L \times N}$, $x_n$ is a vector of symbols transmitted from antenna n, X is a matrix of zero mean and unit variance correlated Gaussian RVs, $\Lambda \in R^{N \times N}$ is the diagonal matrix of eigenvalues and $W \in C^{N \times N}$ is the matrix of eigenvectors of R. As X is the matrix of correlated Gaussian RVs, it cannot guarantee a FACE solution and may have high PAPR. Using non-linear mapping functions, the easily generated Gaussian RVs can be mapped onto the M-PSK, M-PAM or M-QAM finite alphabet RVs. The general relationship between the cross-correlation of Gaussian and finite alphabet RVs is derived below.

Let $\psi_{pq}$ be the cross-correlation between the finite alphabet waveforms $y_p(n)$ and $y_q(n)$ and $\rho_{pq}$ be the cross-correlation between the Gaussian RVs $x_p(n)$ and $x_q(n)$. Through a memoryless non-linear function $f(\cdot)$, the Gaussian RVs $x_p$ and $x_q$ can be mapped onto FACE or FANCE RVs as $y_p = f(x_p)$ and $y_q = f(x_q)$. The relationship between the cross-correlation coefficients $\psi_{pq}$ and $\rho_{pq}$ is given by:

$$\psi_{pq} \equiv \int_{-\infty}^{+\infty} \int_{-\infty}^{+\infty} y_p y_q^* p(x_p, x_q, \rho_{pq}) dx_p dx_q, \qquad (6)$$

-continued $$\text{where } p(x_p, x_q, \rho_{pq}) \equiv \frac{1}{2\pi\sqrt{1-\rho_{pq}^2}} e^{-\frac{x_p^2 - 2x_p x_q \rho_{pq} + x_q^2}{2(1-\rho_{pq}^2)}}$$

is the joint probability distribution function (PDF) of $x_p$ and $x_q$.

To separate the double integration in EQN (6), the physicists' Hermite polynomials can be used to get the following expression:

$$\psi_{pq} = \sum_{n=0}^{+\infty} \frac{\rho_{pq}^n}{2^n n!} \int_{-\infty}^{+\infty} f(x_p) H_n\left(\frac{x_p}{\sigma_p \sqrt{2}}\right) \qquad (7)$$

$$p(x_p) dx_p \times \int_{-\infty}^{+\infty} f(x_q) H_n\left(\frac{x_q}{\sigma_q \sqrt{2}}\right) p(x_q) dx_q,$$

where p(x) is the PDF of real Gaussian RV and $H_n(x)$ are the physicists' Hermite polynomials.

In this case, $x_p$ and $x_q$ have the same variance, i.e. $\sigma_p = \sigma_q = 1$. Thus, EQN (7) can be further simplified to:

$$\psi_{pq} = \frac{1}{2\pi} \sum_{n=0}^{+\infty} \left| \int_{-\infty}^{+\infty} f(x) H_n\left(\frac{x}{\sqrt{2}}\right) e^{-\frac{x^2}{2}} dx \right|^2 \frac{\rho_{pq}^n}{2^n n!}, \qquad (8)$$

If M is the number of alphabets in a modulation scheme, then the PDF region is divided into M regions using delimiters $\alpha_m$, $$m = -\frac{M}{2}, \ldots, 0, \ldots, \frac{M}{2}.$$

Depending on the application, the modulation scheme may contain symbols with a different probability of appearance $p_m$, $$m = -\frac{M}{2}, \ldots, -1, 1, \ldots, \frac{M}{2}.$$

Therefore, the delimiters $\alpha_m$ are chosen such that:

$$\begin{cases} \alpha_{\pm \frac{M}{2}} = \pm\infty \\ \int_{\sqrt{2}\alpha_{m-1}}^{\sqrt{2}\alpha_m} \frac{1}{\sqrt{2\pi}} \exp\left(-\frac{x^2}{2}\right) = p_m \end{cases} \qquad (9)$$

To generate equiprobable symbols, $$p_m = \frac{1}{M}.$$

Thus, considering the symmetry of the Gaussian PDF function, it can be deduced that:

$$\begin{cases} \alpha_0 = 0 \\ \alpha_i = -\alpha_{-i} \quad \text{for } i = 1, 2, \ldots, \frac{M}{2}. \end{cases} \quad (10)$$

Referring to FIG. 1, shown is a plot illustrating an example of how a Gaussian PDF is divided into eight of equal area regions to generate eight equiprobable symbols. Moreover, to ensure that $\psi_{pq}$ spans over the closed set $[-1,1]$, the memoryless non-linear mapping function $f(x)$ should be an odd function.

With $H_n(-x)=(-1)^n H_n(x)$, it is possible to substitute $$\tilde{x} = \frac{x}{\sqrt{2}}$$

and the relationship between the correlation of Gaussian and mapped RVs of EQN (8) can be rewritten as:

$$\psi_{pq} = \frac{1}{\pi} \sum_{n=0}^{+\infty} \frac{\rho_{pq}^n}{2^n n!} \left| \int_0^{+\infty} f(\tilde{x}\sqrt{2})(H_n(\tilde{x}) - (-1)^n H_n(\tilde{x})) e^{-\tilde{x}^2} d\tilde{x} \right|^2 \quad (11)$$

$$= \frac{2}{\pi} \sum_{n=0}^{+\infty} \frac{\rho_{pq}^{2n+1}}{2^{2n}(2n+1)!} \left| \int_0^{+\infty} f(\tilde{x}\sqrt{2}) H_{2n+1}(\tilde{x}) e^{-\tilde{x}^2} d\tilde{x} \right|^2.$$

By mapping Gaussian RVs between the region $]\alpha_{m-1}, \alpha_m[$ onto a constellation symbol $s_m$, the expression above can be divided into a sum of integrals as follows:

$$\psi_{pq} = \frac{2}{\pi} \sum_{n=0}^{+\infty} \frac{\rho_{pq}^{2n+1}}{2^{2n}(2n+1)!} \left| \sum_{m=1}^{M/2} s_m \int_{\alpha_{m-1}}^{\alpha_m} H_{2n+1}(\tilde{x}) e^{-\tilde{x}^2} d\tilde{x} \right|^2. \quad (12)$$

The relationship between the Gaussian and non-Gaussian RVs in EQN (12) can also be written as:

$$\psi_{pq} = \frac{2}{\pi} \sum_{n=0}^{+\infty} \frac{\rho_{pq}^{2n+1}}{2^{2n}(2n+1)!} \left| \sum_{m=1}^{M/2} (s_m - s_{m+1}) \int_0^{\alpha_m} H_{2n+1}(\tilde{x}) e^{-\tilde{x}^2} d\tilde{x} \right|^2. \quad (13)$$

In order to simplify this relationship, the Hermite integrals can be expressed as:

$$A_n = \int_0^\alpha H_{2n+1}(x) e^{-x^2} dx \quad (14)$$

$$= (-1)^n \alpha^2 \frac{(2n+1)!}{n!} {}_2F_2\left(\frac{2n+3}{2}, 1, \frac{3}{2}, 2, -\alpha^2\right)$$

$$= (-1)^n \frac{2n!}{n!} \frac{\alpha^2}{(2n-1)!!} \sum_{k=0}^{+\infty} (-1)^k \frac{(2k+2n+1)!!}{(k+1)!(2k+1)!!}.$$

$$B_n = (-1)^n \frac{2n!}{n!}$$

is defined as a common factor independent of $\alpha$ and $$C_n(\alpha) = \frac{\alpha^2}{(2n-1)!!} \sum_{k=0}^{+\infty} (-1)^k \frac{(2k+2n+1)!!}{(k+1)!(2k+1)!!}$$

is an infinite sum dependent upon $\alpha$. Using the Taylor expansion of $\exp(\cdot)$, $C_n(\alpha)$ can be written as:

$$C_n(\alpha) = \quad (15)$$

$$\begin{cases} C_0(\alpha) = 1 - e^{-\alpha^2} \\ C_1(\alpha) = 1 + (2\alpha^2 - 1)e^{-\alpha^2} \\ C_{k+2}(\alpha) = 2C_{k+1}(\alpha) - C_k(\alpha) - e^{-\alpha^2} \sum_{i=0}^{k} \frac{\binom{k}{i}(-2\alpha^2)^{i+2}}{(2i+3)!!}, \forall k \in \mathbb{N}. \end{cases}$$

Assuming that $C_n(\alpha) = 1 + c_n(\alpha)e^{-\alpha^2}$, the expression for $c_n(\alpha)$ can be derived from EQN (15) to be:

$$c_n(\alpha_m) = \quad (16)$$

$$\begin{cases} c_0(\alpha) = (-1) \\ c_1(\alpha) = 2\alpha^2 - 1 \\ c_{k+2}(\alpha) = 2c_{k+1}(\alpha) - c_k(\alpha) - \sum_{i=0}^{k} \frac{\binom{k}{i}(-2\alpha_m^2)^{i+2}}{(2i+3)!!}, \forall k \in \mathbb{N}. \end{cases}$$

Using the relationship:

$$\sum_{k=0}^{m} \binom{n+k}{n} = \binom{n+m+1}{n+1}, \quad (17)$$

$c_n(\alpha)$ can be further simplified and written in a non-recursive manner as:

$$c_n(\alpha_m) = 2n\alpha_m^2 - 1 - \sum_{i=2}^{n} \frac{\binom{n}{i}(-2\alpha_m^2)^i}{(2i-1)!!}, n \in \mathbb{N} \quad (18)$$

$$= -{}_1F_1\left(-n, \frac{1}{2}, \alpha_m^2\right).$$

Substituting EQN 18 and $C_n(\alpha) = 1 + c_n(\alpha)e^{-\alpha^2}$ into EQN 14, the expression for the Hermite integrals becomes:

$$A_n = \int_0^\alpha H_{2n+1}(x) e^{-x^2} dx \quad (19)$$

$$= (-1)^n \alpha^2 \frac{(2n+1)!}{n!} {}_2F_2\left(\frac{2n+3}{2}, 1, \frac{3}{2}, 2, -\alpha^2\right)$$

-continued $$= (-1)^n \frac{2n!}{n!}\left(1 - {}_1F_1\left(-n, \frac{1}{2}, \alpha^2\right)e^{-\alpha^2}\right)$$

$$= (-1)^n \frac{2n!}{n!}\left(1 - {}_1F_1\left(n + \frac{1}{2}, \frac{1}{2}, -\alpha^2\right)\right),$$

Figure 2:
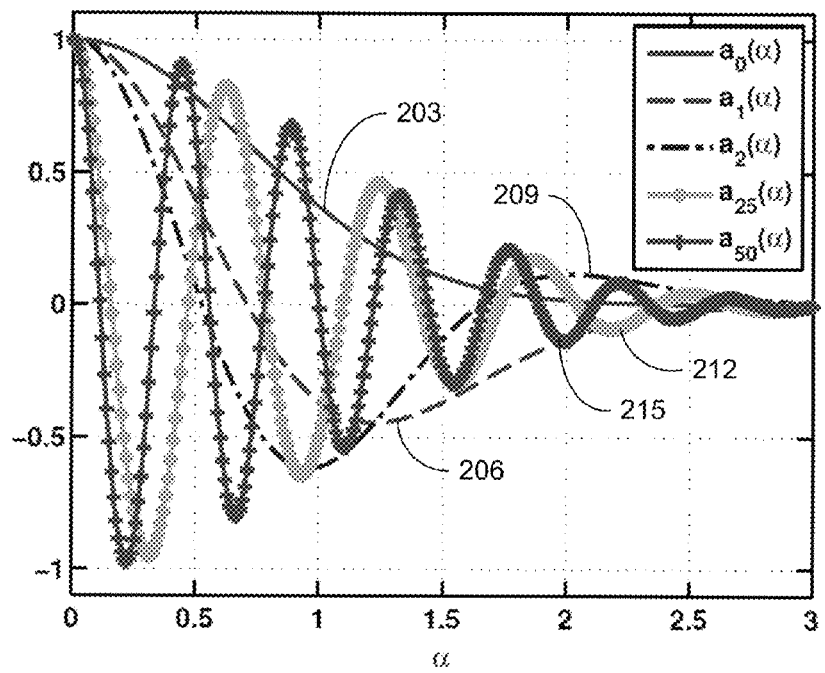
FIG. 2 is a plot illustrating an example of the behavior of the Kummer confluent hypergeometric function $\alpha_n(\alpha)$ as a function of $\alpha$ in accordance with various embodiments of the present disclosure.

With this result, the integrals in EQN (12) can be expressed as:

$$\int_{\alpha_{m-1}}^{\alpha_m} H_{2n+1}(\tilde{x})e^{-\tilde{x}^2}d\tilde{x} = \int_0^{\alpha_m} H_{2n+1}(\tilde{x})e^{-\tilde{x}^2}d\tilde{x} - \int_0^{\alpha_{m-1}} H_{2n+1}(\tilde{x})e^{-\tilde{x}^2}d\tilde{x} \quad (20)$$

$$= (-1)^n \frac{2n!}{n!}(\alpha_n(\alpha_{m-1}) - \alpha_n(\alpha_m)),$$

where $$\alpha_n(\alpha_m) = {}_1F_1\left(n + \frac{1}{2}, \frac{1}{2}, -\alpha_m^2\right)$$

is the Kummer confluent hypergeometric function. To illustrate the behavior of the power series $\alpha_n(\alpha)$, FIG. 2 shows the effect of the index n on its pseudo-period for n=0, 1, 2, 25 and 50 (curves 203, 206, 209, 212 and 215, respectively). The power series $\alpha_n$ reaches lower values as $\alpha$ increases and its oscillation frequency increases as its index increases. Using EQN (20), the relationship in EQN (12) can be finally written as follows $$\psi_{pq} = \quad (21)$$

$$\mathcal{F}(\rho_{pq}) = \frac{2}{\pi}\sum_{n=0}^{+\infty}\frac{\rho_{pq}^{2n+1}(|2n-1|)!!}{(2n+1)(2n)!!}\left|\sum_{m=1}^{M/2}s_m(\alpha_n(\alpha_{m-1}) - \alpha_n(\alpha_m))\right|^2.$$

Since all the terms of the infinite sum in EQN(14) are positive, using the theorems presented above, it can be said that if the scalar $\rho_{pq}$ is replaced by a positive semidefinite matrix $R_g$, the corresponding matrix on the left hand side will be positive semidefinite. It should also be noted that the relationship between the cross-correlation of Gaussian and corresponding mapped RVs depends on the chosen delimiters $\alpha_m$, $$m = 1, \ldots, \frac{M}{2} - 1,$$

and the symbols $s_m$, $$m = 1, \ldots, \frac{M}{2},$$

assigned to each region.

Real Gaussian RVs can be mapped onto the memoryless complex exponential functions to generate PSK modulated RVs and match symmetric beampatterns. These results may be used to generate PAM and QAM modulated waveforms.

Generation of PSK Waveforms

The generalized results that have been derived can be applied to generate correlated finite-alphabet constant-envelope (FACE) signals using a PSK modulation scheme. The closed form relationship of the cross-correlation between real Gaussian RVs and BPSK, QPSK and 8-PSK symbols are discussed below.

To generate BPSK waveforms, the Gaussian RVs can be mapped into ($\pm 1$) symbols using the mapping function $$y = f(x) = \text{sign}(x), \quad (22)$$

where sign(•) is the mapping function. In the case of BPSK waveforms, using $$\int_0^{+\infty} H_{2n+1}(\tilde{x})e^{-\tilde{x}^2}d\tilde{x} = (-1)^n \frac{2n!}{n!},$$

the relationship between the correlation of Gaussian and BPSK RVs can be derived as:

$$\psi_{pq} = \frac{2}{\pi}\sum_{n=0}^{+\infty}\frac{\rho_{pq}^{2n+1}}{2^{2n}(2n+1)!}\left|\int_0^{+\infty}H_{2n+1}(\tilde{x})e^{-\tilde{x}^2}d\tilde{x}\right|^2 \quad (23)$$

$$= \frac{2}{\pi}\sum_{n=0}^{+\infty}\frac{\rho_{pq}^{2n+1}(|2n-1|)!!}{(2n+1)(2n)!!}$$

$$= \frac{2}{\pi}\sin^{-1}(\rho_{pq}).$$

To generate QPSK waveforms, the PDF of Gaussian RVs is equally divided into four regions and mapped onto the symbols $$s_m = \left\{e^{-j\frac{\pi}{4}}, e^{-j\frac{3\pi}{4}}, e^{j\frac{\pi}{4}}, e^{j\frac{3\pi}{4}}\right\}$$

using the function:

$$y = f(x) = \exp\left[j\frac{\pi}{4}\left(2\text{sign}(x) - \text{sign}\left(1 - \frac{x^2}{2\alpha_1^2}\right)\right)\right] \quad (24)$$

$$= \begin{cases} e^{j\frac{\pi}{4}} & \text{if } x \in [0, \sqrt{2}\,\alpha_1], \\ e^{j\frac{3\pi}{4}} & \text{if } x > \sqrt{2}\,\alpha_1, \\ -f(-x) & \text{if } x < 0. \end{cases}$$

For all symbols to be equiprobable, the delimiter $\alpha_1 = 0.4769$ is determined using the inverse-cumulative distribution-function (ICDF) associated with the standard normal distribution, also called probit function. Using EQN (12), the cross-correlation relationship between the Gaussian and QPSK RVs can be derived as shown below:

$$\psi_{pq} = \frac{2}{\pi}\sum_{n=0}^{+\infty}\frac{\rho_{pq}^{2n+1}}{2^{2n}(2n+1)!} \quad (25)$$

$$\left|e^{j\frac{\pi}{4}}\int_0^{\alpha_1}H_{2n+1}(\tilde{x})e^{-\tilde{x}^2}d\tilde{x} + e^{j\frac{3\pi}{4}}\int_{\alpha_1}^{\infty}H_{2n+1}(\tilde{x})e^{-\tilde{x}^2}d\tilde{x}\right|^2,$$

Using the result in EQN (20), EQN (25) can be reformulated as:

$$\psi_{pq} = \frac{2}{\pi} \sum_{n=0}^{+\infty} \frac{\rho_{pq}^{2n+1}(|2n-1|)!!}{(2n+1)(2n)!!} \left| e^{j\frac{\pi}{4}}(1-\alpha_n(\alpha_1)) + e^{j\frac{3\pi}{4}}\alpha_n(\alpha_1) \right|^2 \quad (26)$$

$$= \frac{2}{\pi} \sum_{n=0}^{+\infty} \frac{\rho_{pq}^{2n+1}(|2n-1|)!!}{(2n+1)(2n)!!}(1 - 2\alpha_n(\alpha_1) + 2\alpha_n^2(\alpha_1)).$$

When generating 8-PSK waveforms, by applying the probit function, the Gaussian RVs are divided into eight regions and mapped onto $$s_m = \left\{ e^{-j\frac{\pi}{8}}, e^{-j\frac{3\pi}{8}}, e^{-j\frac{5\pi}{8}}, e^{-j\frac{7\pi}{8}}, e^{j\frac{\pi}{8}}, e^{j\frac{3\pi}{8}}, e^{j\frac{5\pi}{8}}, e^{j\frac{7\pi}{8}} \right\}$$

using the following mapping function:

$$y = f(x) = \exp\left[ j\frac{\pi}{8}\left( 4\text{sign}(x) - 2\text{sign}\left(1 - \frac{x^2}{2\alpha_2^2}\right) - \right. \right. \quad (27)$$

$$\left. \left. \text{sign}\left(\left(1 - \frac{x^2}{2\alpha_1^2}\right)\left(1 - \frac{x^2}{2\alpha_2^2}\right)\left(1 - \frac{x^2}{2\alpha_3^2}\right)\right)\right)\right]$$

$$= \begin{cases} e^{j\frac{\pi}{8}} & \text{if } x \in [0, \sqrt{2}\,\alpha_1], \\ e^{j\frac{3\pi}{8}} & \text{if } x \in ]\sqrt{2}\,\alpha_1, \sqrt{2}\,\alpha_2], \\ e^{j\frac{5\pi}{8}} & \text{if } x \in ]\sqrt{2}\,\alpha_2, \sqrt{2}\,\alpha_3], \\ e^{j\frac{7\pi}{8}} & \text{if } x > \sqrt{2}\,\alpha_3, \\ -f(-x) & \text{if } x < 0. \end{cases}$$

where for equiprobable 8-PSK symbols, the delimiters are:

$$\begin{cases} \alpha_1 = 0.2253 \\ \alpha_2 = 0.4769 \\ \alpha_3 = 0.8134 \end{cases} \quad (28)$$

To generate 8-PSK waveforms, the relationship between the cross-correlation of Gaussian and 8-PSK RVs can be derived using EQN (21) as:

$$\psi_{pq} = \frac{2}{\pi} \sum_{n=0}^{+\infty} \frac{\rho_{pq}^{2n+1}}{2^{2n}(2n+1)!} \left| e^{j\frac{\pi}{8}}(1 - \alpha_n(\alpha_1)) + \right. \quad (29)$$

$$\left. e^{j\frac{3\pi}{8}}(\alpha_n(\alpha_1) - \alpha_n(\alpha_2)) + e^{j\frac{5\pi}{8}}(\alpha_n(\alpha_2) - \alpha_n(\alpha_3)) + e^{j\frac{7\pi}{8}}\alpha_n(\alpha_3) \right|^2.$$

Figure 3:
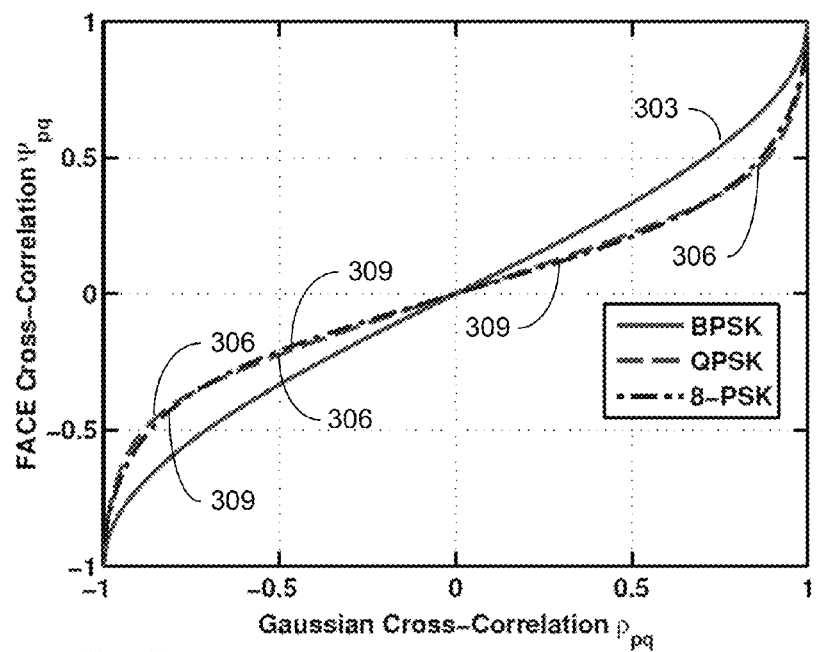
FIG. 3 is a graph illustrating an example of the relation between Gaussian and FACE RVs for BPSK, QPSK and 8-PSK waveforms in accordance with various embodiments of the present disclosure.

Referring to FIG. 3, shown is a graph illustrating an example of the relation between Gaussian and FACE RVs for BPSK, QPSK and 8-PSK waveforms (curves 303, 306 and 309, respectively). As can be seen from the plotted curves, the absolute value of the cross correlation of higher QPSK and 8-PSK signals is always less than the absolute value of BPSK symbols.

Generation of PAM Waveforms

The derivations to find the relationship between the cross-correlation of Gaussian RVs and PAM waveforms are based upon EQN (21). In order to generate the 4-PAM constellation symbols $$\left\{ -\frac{3}{\sqrt{5}}, -\frac{1}{\sqrt{5}}, \frac{1}{\sqrt{5}}, \frac{3}{\sqrt{5}} \right\},$$

the mapping function $f(\cdot)$ becomes:

$$y = f(x) \quad (30)$$

$$= \frac{1}{\sqrt{5}}\left( 2\text{sign}(x) - \text{sign}\left(x - \frac{x^3}{2\alpha_1^2}\right)\right)$$

$$= \begin{cases} \frac{1}{\sqrt{5}} & \text{if } x \in [0, \sqrt{2}\,\alpha_1], \\ \frac{3}{\sqrt{5}} & \text{if } x > \sqrt{2}\,\alpha_1, \\ -f(-x) & \text{if } x < 0. \end{cases}$$

where the delimiter $\alpha_1 = 0.4769$, which is the same as the QPSK waveforms above. To generate 4-PAM waveforms, the relationship between the Gaussian RVs and the 4-PAM symbols can be written as follows:

$$\psi_{pq} = \frac{2}{5\pi} \sum_{n=0}^{+\infty} \frac{\rho_{pq}^{2n+1}}{2^{2n}(2n+1)!} \quad (31)$$

$$\left| \int_0^{\alpha_1} H_{2n+1}(\tilde{x})e^{-\tilde{x}^2}\,d\tilde{x} + 3\int_{\alpha_1}^{\infty} H_{2n+1}(\tilde{x})e^{-\tilde{x}^2}\,d\tilde{x} \right|^2.$$

By using the result of EQN (20), the relationship of EQN 31 can finally be expressed as:

$$\psi_{pq} = \frac{2}{5\pi} \sum_{n=0}^{+\infty} \frac{\rho_{pq}^{2n+1}(|2n-1|)!!}{(2n+1)(2n)!!}(1 - 4\alpha_n(\alpha_1) + 4\alpha_n^2(\alpha_1)). \quad (32)$$

The relationship can be approximated by minimizing a least square problem. The following approximations proved to give good results as will be discussed later with respect to the simulation results:

$$\psi_{pq} \approx \frac{2}{\pi} \frac{\sin^{-1}(\rho_{pq})}{0.71 + 0.45\rho_{pq}^2 - 1.05\rho_{pq}^4 + 0.89\rho_{pq}^6}, \text{ and} \quad (33)$$

$$\rho_{pq} \approx \frac{\sin\left(\frac{\pi}{2}\psi_{pq}\right)}{1.33 - 0.25\psi_{pq}^2 - 0.38\psi_{pq}^4 + 0.30\psi_{pq}^6}. \quad (34)$$

When generating 8-PSK waveforms, the same delimiters as in EQN (28) are used. The standard Normal PDF is divided into 8 equiprobable regions (e.g., as in FIG. 1), which are mapped onto the 8-PAM symbols $$\left\{-\frac{7}{\sqrt{21}}, -\frac{5}{\sqrt{21}}, -\frac{3}{\sqrt{21}}, -\frac{1}{\sqrt{21}}, \frac{1}{\sqrt{21}}, \frac{3}{\sqrt{21}}, \frac{5}{\sqrt{21}}, \frac{7}{\sqrt{21}}\right\}$$

through the following mapping function:

$$y = f(x) = \frac{1}{\sqrt{21}}\left(4\text{sign}(x) - 2\text{sign}\left(x - \frac{x^3}{2\alpha_1^2}\right) - \text{sign}\left(x\left(1 - \frac{x^2}{2\alpha_1^2}\right)\left(1 - \frac{x^2}{2\alpha_2^2}\right)\left(1 - \frac{x^2}{2\alpha_3^2}\right)\right)\right) \quad (35)$$

$$= \begin{cases} \frac{1}{\sqrt{21}} & \text{if } x \in [0, \sqrt{2}\,\alpha_1], \\ \frac{3}{\sqrt{21}} & \text{if } x \in ]\sqrt{2}\,\alpha_1, \sqrt{2}\,\alpha_2], \\ \frac{5}{\sqrt{21}} & \text{if } x \in ]\sqrt{2}\,\alpha_2, \sqrt{2}\,\alpha_3], \\ \frac{7}{\sqrt{21}} & \text{if } x > \sqrt{2}\,\alpha_3, \\ -f(-x) & \text{if } x < 0. \end{cases}$$

Again applying EQN (14) in the case of 8-PAM symbols leads to the following relationship:

$$\psi_{pq} = \frac{2}{21\pi}\sum_{n=0}^{+\infty}\frac{\rho_{pq}^{2n+1}}{2^{2n}(2n+1)!}|(1-\alpha_n(\alpha_1)) + \quad (36)$$

$$3(\alpha_n(\alpha_1) - \alpha_n(\alpha_2)) +$$

$$5(\alpha_n(\alpha_2) - \alpha_n(\alpha_3)) + 7\alpha_n(\alpha_3)|^2$$

$$= \frac{2}{21\pi}\sum_{n=0}^{+\infty}\frac{\rho_{pq}^{2n+1}}{2^{2n}(2n+1)!}\left|1 + 2\sum_{m=1}^{m=3}\alpha_n(\alpha_m)\right|^2.$$

Using a least square method again, the relationship of EQN (36) can be approximated by:

$$\psi_{pq} \approx \frac{\rho_{pq}}{1.09 - 0.15\rho_{pq}^2 + 0.23\rho_{pq}^4 - 0.17\rho_{pq}^6}, \text{ and} \quad (37)$$

$$\rho_{pq} \approx \frac{\sin\left(\frac{2}{\pi}\psi_{pq}\right)}{1.45 - 0.43\psi_{pq}^2 - 0.16\psi_{pq}^4 + 0.14\psi_{pq}^6}. \quad (38)$$

Figure 4:
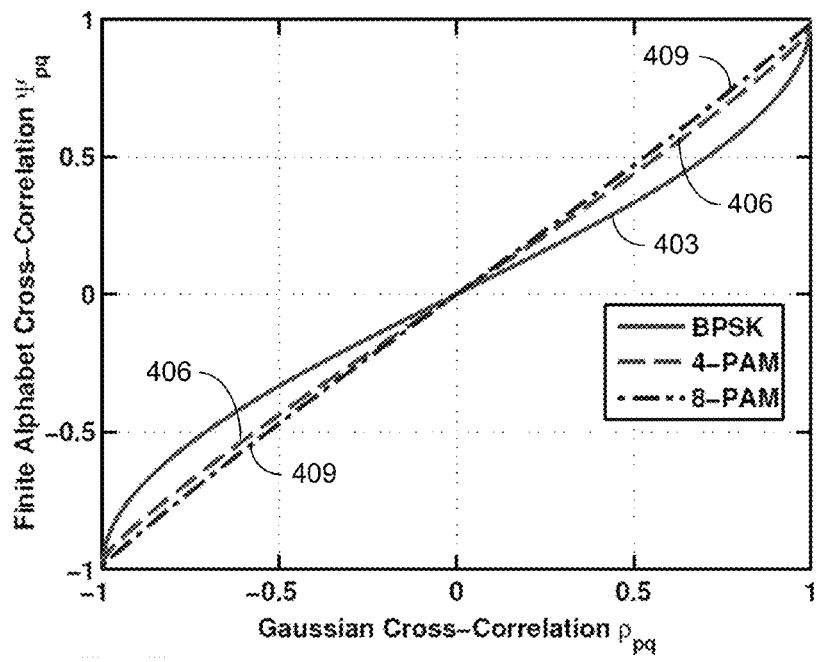
FIG. 4 is a graph illustrating an example of the relation between Gaussian and finite-alphabet non-constant-envelope (FANCE) random-variables (RVs) for BPSK, 4-PAM and 8-PAM waveforms in accordance with various embodiments of the present disclosure.

Referring now to FIG. 4, shown is a graph illustrating an example of the relation between Gaussian and finite-alphabet non-constant-envelope (FANCE) RVs for BPSK, 4-PAM and 8-PAM waveforms (curves 403, 406 and 409, respectively). As can be seen from FIG. 4, as the number of symbols increases the relationship between the cross-correlation of Gaussian and PAM RVs gets closer to the identity function. Thus, more covariance matrices will remain positive semidefinite when applying the inverse relationship, $F^{-1}$.

Generation of QAM Waveforms

If the beampattern is non-symmetric, for optimum beampattern match, R will be complex symmetric. For R to be complex, waveforms should also be complex. Therefore, complex Gaussian RVs can be mapped onto QAM alphabets based on the method to generate PAM signals. To generate an M-QAM RV (y) from a complex Gaussian RV ($x = x_R + jx_I$), the following mapping function can be used:

$$y = f_Q(x) = \frac{1}{\sqrt{2}}[f_P(x_R) + jf_P(x_I)], \quad (39)$$

where $f_Q(\cdot)$ denotes the mapping function used to generate M-QAM symbols while $f_P(\cdot)$ denotes the mapping function used to generate $\sqrt{M}$-PAM symbols.

Consider the positive-semidefinite covariance matrix of the complex Gaussian RVs, $R_g$. Since the covariance matrix is complex, the matrix of corresponding correlated complex Gaussian RVs can be written as $X = [x_{R_1} + jx_{I_1}\ x_{R_2} + jx_{I_2}\ \ldots\ x_{R_N} + jx_{I_N}]$ using EQN (5). Let $\psi_{pq} = \psi_{R_{pq}} + j\psi_{I_{pq}}$ be the complex cross-correlation between the M-QAM RVs $y_p$ (n) and $y_q$ (n), and $\rho_{pq} = \rho_{R_{pq}} + j\rho_{I_{pq}}$ be the complex cross-correlation between the complex Gaussian RVs $x_p$ (n) and $x_q$ (n). Using EQN (39), the components of $\psi_{pq}$ can be written as:

$$\psi_{R_{pq}} = \frac{1}{2}E\{f_P(x_{Rp})f_P(x_{Rq}) + f_P(x_{Ip})f_P(x_{Iq})\}, \quad (40)$$

$$\psi_{I_{pq}} = \frac{1}{2}E\{f_P(x_{Ip})f_P(x_{Rq}) - f_P(x_{Rp})f_P(x_{Iq})\}.$$

Using a de-whitening transformation, the waveform vector X can satisfy the following relationship:

$$E\{x_{Rp}x_{Rq}\} = E\{x_{Ip}x_{Iq}\}, \quad (41)$$

$$E\{x_{Rp}x_{Iq}\} = -E\{x_{Ip}x_{Rq}\}. \quad (42)$$

Thus, EQN (40) can be rewritten as:

$$\psi_{R_{pq}} = E\{f_P(x_{Rp})f_P(x_{Rq})\},$$

$$\psi_{I_{pq}} = E\{f_P(x_{Ip})fp(x_{Rq})\}. \quad (43)$$

Using EQN (20) and EQN (21), the relationship linking both real and imaginary parts of the complex Gaussian RVs and the M-QAM symbols can be expressed as a Taylor series.

To generate 16-QAM signals from complex Gaussian RVs, a mapping function similar to the one in EQN (30) can be used:

$$y = \frac{1}{\sqrt{2}}[f_{4PAM}(x_R) + f_{4PAM}(x_I)] \quad (44)$$

where $f_{4PAM}(\cdot)$ is as defined in EQN(30) and $\alpha_1 = 0.4769$ is chosen to ensure that all 16 symbols are equiprobable. Therefore, from EQN (43), the relationship between the cross-correlation of Gaussian RVs and 16-QAM symbols can be deduced as:

$$\psi_{R_{pq}} = \frac{2}{5\pi}\sum_{n=0}^{+\infty}\frac{\rho_{R_{pq}}^{2n+1}(|2n-1|)!!}{(2n+1)(2n)!!}|1 + 2\alpha_n(\alpha_1)|^2, \quad (45)$$

$$\psi_{I_{pq}} = \frac{2}{5\pi}\sum_{n=0}^{+\infty}\frac{\rho_{I_{pq}}^{2n+1}(|2n-1|)!!}{(2n+1)(2n)!!}|1 + 2\alpha_n(\alpha_1)|^2.$$

The following mapping function is used to map the complex Gaussian RVs onto 64-QAM symbols:

$$y = \frac{1}{\sqrt{2}} [f_{8PAM}(x_R) + f_{8PAM}(x_I)] \quad (46)$$

where $f_{8PAM}(\cdot)$ is as defined in EQN(35) and the delimiters are chosen as in EQN (28). To generate 64-QAM signals, from EQN (43), the relationship between the cross correlation of finite alphabets and Gaussian RVs becomes:

$$\psi_{R_{pq}} = \frac{2}{21\pi} \sum_{n=0}^{+\infty} \frac{\rho_{R_{pq}}^{2n+1}}{2^{2n}(2n+1)!} \left| 1 + 2 \sum_{m=1}^{m=3} \alpha_n(\alpha_m) \right|^2, \quad (47)$$

$$\psi_{I_{pq}} = \frac{2}{21\pi} \sum_{n=0}^{+\infty} \frac{\rho_{I_{pq}}^{2n+1}}{2^{2n}(2n+1)!} \left| 1 + 2 \sum_{m=1}^{m=3} \alpha_n(\alpha_m) \right|^2.$$

Validation

To validate the performance of the waveforms, a uniform linear array of N=10 antenna elements with half-wavelength inter-element spacing was used. The transmitted power from each antenna was equal to unity and the region of interest ranged from [−90°, 90°] with a mesh grid size of 1°. To begin, BPSK waveforms are used to match the covariance matrix of an auto-regressive process of order 1. Next, a performance comparison is drawn between BPSK and higher PAM waveforms in order to match symmetric beampatterns. Finally, QAM waveforms are used to directly match non-symmetric beampatterns.

Figure 5:
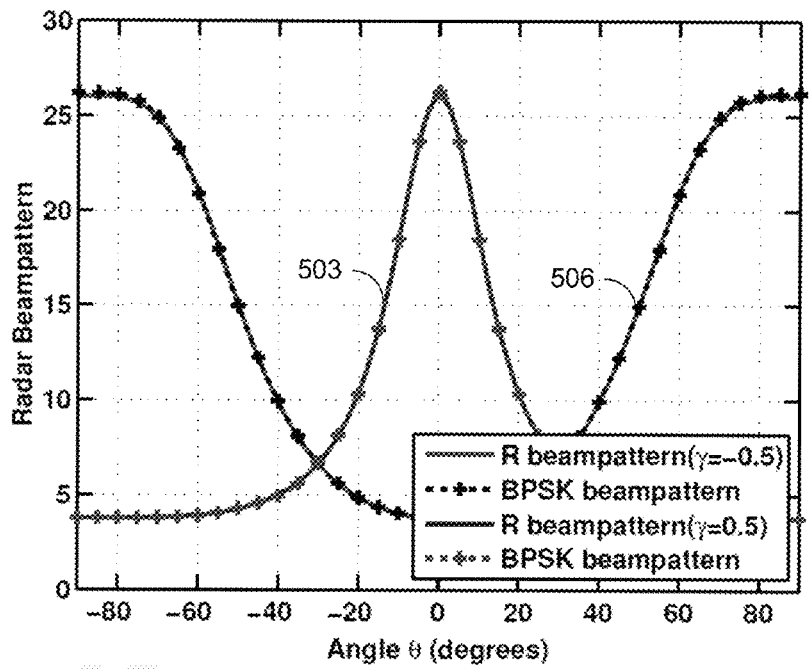
FIG. 5 is a graph illustrating an example of beampattern matching in accordance with various embodiments of the present disclosure.

Beampattern of First Order Auto-Regressive Processes. For this simulation, an auto-regressive process of order 1 was considered. Its covariance matrix was defined as:

$$R(p,q) = \gamma^{|p-q|}, (p,q) = \{1, \ldots, N\}^2 \quad (48)$$

where R(p, q) is the cross-correlation between the transmitted waveforms from antenna p and q. This particular case is interesting because if the inverse relationship $F^{-1}$ between the cross-correlation of Gaussian and BPSK RVs is applied on the generated covariance matrix R, the resulting covariance matrix $R_g$ remains positive semidefinite. Thus, the desired beampattern can be achieved using BPSK waveforms. By computing the covariance matrix $$R_g = \sin\left(\frac{\pi}{2} R\right)$$

for any value of γ, the easily generated Gaussian RVs will be mapped using the sign(•) function to construct the BPSK signals. Referring to FIG. 5, shown is a graph illustrating an example of beampattern matching in the case of a first order auto-regressive process. Simulation results were plotted for two first order auto-regressive processes with γ=0.5 (curves 503) and γ=−0.5 (curves 506). For both cases, the BPSK symbols exhibited a perfect match with the desired beampatterns.

Matching Symmetric Beampatterns. By solving the constrained optimization problem defined in EQN (4), the synthesized covariance matrix R can approximate any complex beampattern. However, when applying the inverse relationship $F^{-1}$ on the synthesized covariance matrix, R, the resulting covariance matrix of Gaussian RVs, $R_g$, may not be a positive semidefinite. However, using EQN (21) and the theorems presented above, it can be proved that $F(R_g)$ is always positive semidefinite, which motivate us to find $R_g$ directly in order not only to solve the positive semidefinite problem but also convert the two step constrained optimization problem into one step constrained optimization problem. Therefore, the following cost-function can be used to optimize for the desired beampattern $$J(R_g) = \frac{1}{K} \sum_{k=1}^{K} (e^H(\theta_k) \mathcal{F}(R_g) e(\theta_k) - \alpha \phi(\theta_k))^2. \quad (49)$$

Since $F(R_g)$ is positive semidefinite, it can be proved that the cost function is convex with respect to $F(R_g)$. To optimize the cost-function with respect to $R_g$, a particle-swarm-optimization (PSO) algorithm may be used.

Figure 6A:
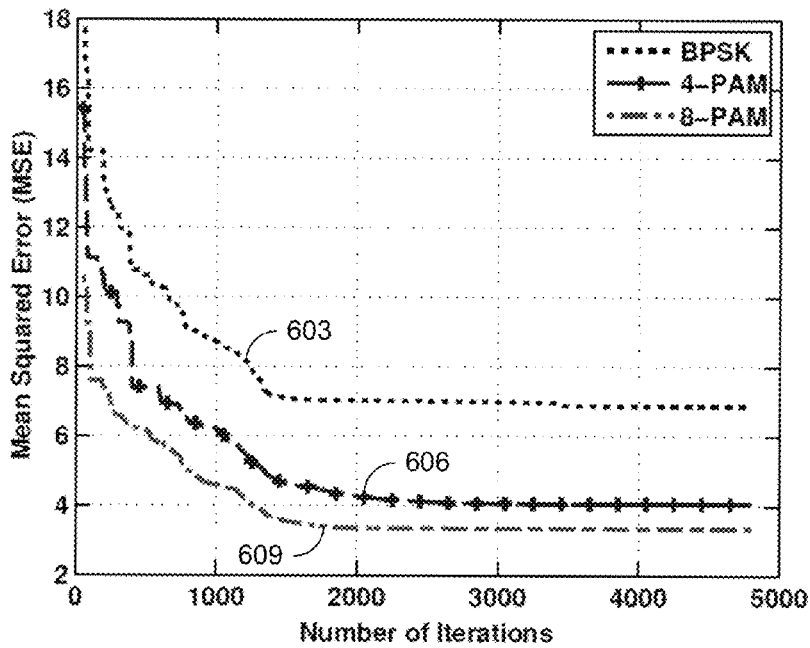
FIGS. 6A and 7A are graphs illustrating examples of convergence performance in accordance with various embodiments of the present disclosure.
Figure 6B:
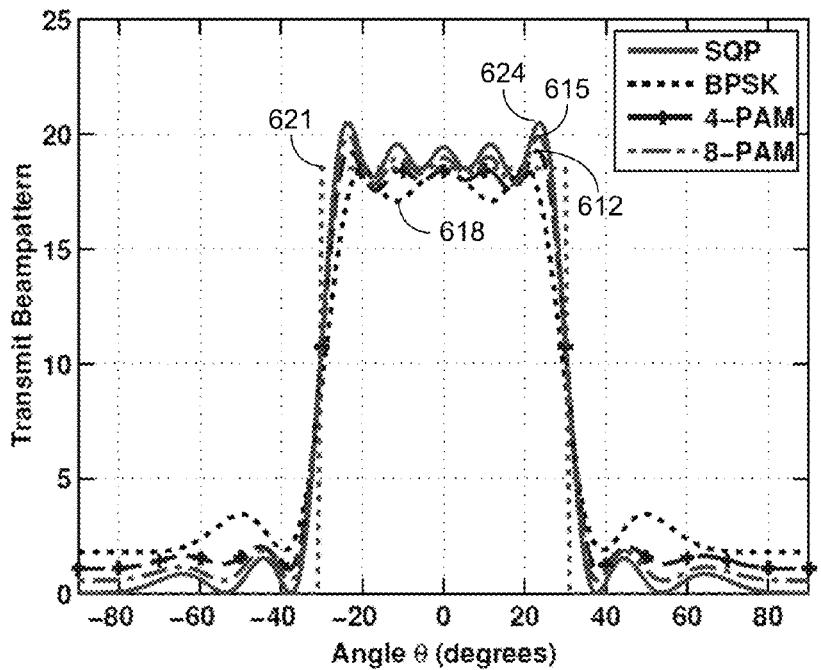
FIGS. 6B, 7B and 8-10 are graphs illustrating examples of beampattern comparisons in accordance with various embodiments of the present disclosure.

For this part, two scenarios were considered. In the first scenario, the transmitted power was maximized between −30 and +30 degrees. FIG. 6A shows an example of the convergence behavior of the PSO algorithm. The minimum mean squared error (MSE) was reached using different modulation schemes. After convergence, the MSE using BPSK waveforms (curve 603) was 6.8. While using 4-PAM and 8-PAM waveforms (curves 606 and 609, respectively), the MSE respectively was 4 and 3.3. This difference in performance can also be seen in FIG. 6B, where the PAM constellation waveforms (curve 612 for 4-PAM and curve 615 for 8-PAM) outperform the BPSK waveform (curve 618), and better approximate the desired beampattern (curve 621). As can be seen in FIG. 6B, the beampattern of 8-PAM symbols (curve 615) is closest to the beampattern obtained using a semidefinite quadratic programming (SQP) method (curve 624).

Figure 7A:
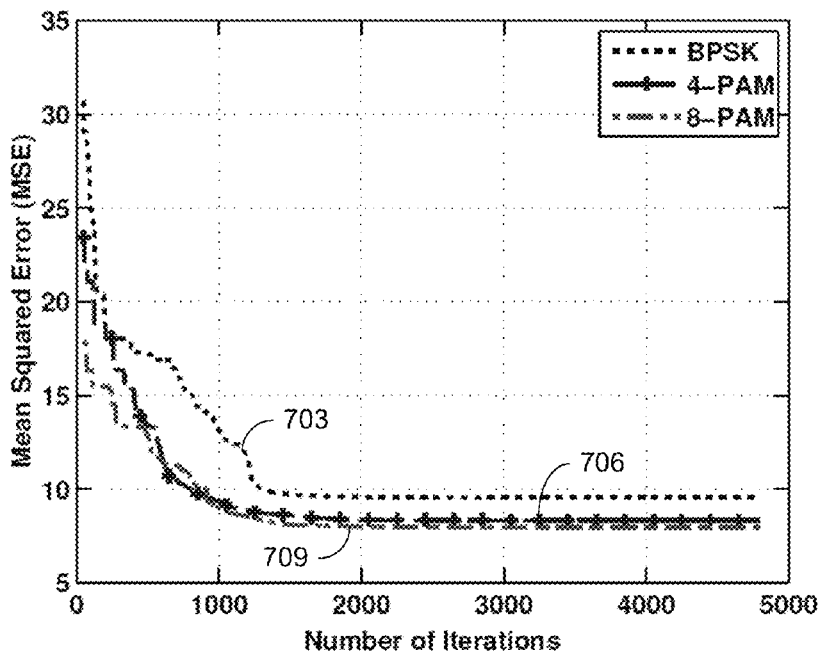
Figure 7B:
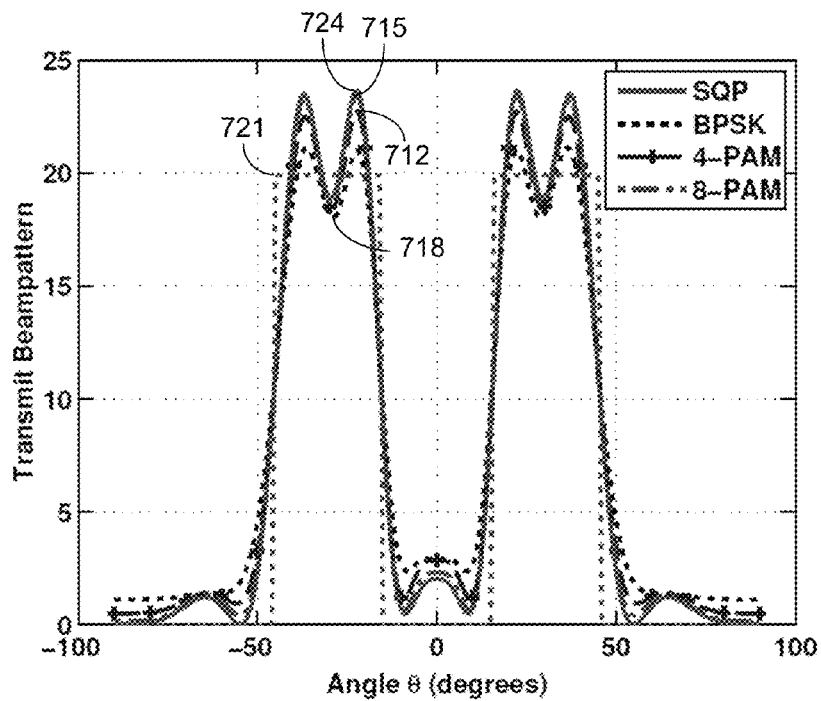

In the second scenario, a split region of interest was from −45 to −15 degrees and from 15 to 45 degrees. FIG. 7A shows that PAM signals (curve 706 for 4-PAM and curve 709 for 8-PAM) reach a lower MSE when compared to the performance of the BPSK signals (curve 703). FIG. 7B indicates that, while the 4-PAM and BPSK beampatterns (curves 712 and 718, respectively) approximate the desired beampattern (curve 721), the beampattern of 8-PAM symbols (curve 715) is very close to the beampattern obtained using the SQP method (curve 724).

Figure 8:
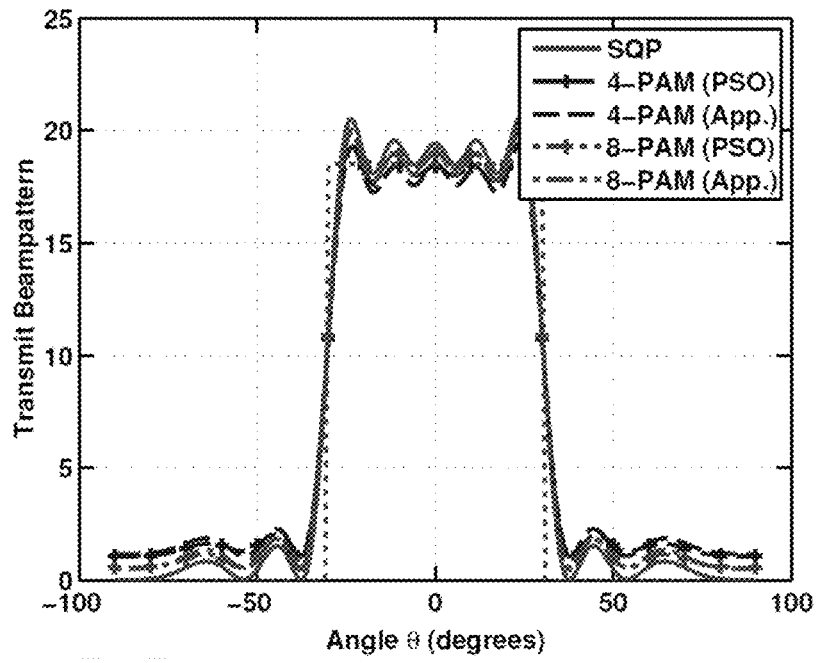

Since the relationship between the cross-correlation of Gaussian and PAM symbols is close to the identity function as shown in FIG. 4, the covariance matrix of the waveforms obtained using SQP method can be used as an approximation of the covariance matrix of the Gaussian RVs, $R_g$. Referring to FIG. 8, the performance of the beampatterns generated for the first scenario using the PSO algorithm was compared with those generated using the approximation $R_g = R_{SQP}$. It can be seen that in the case of 4-PAM and 8-PAM signals, the performance of both methods was nearly the same. Thus, by using the approximation $R_g = R_{SQP}$, the computational burden can be significantly reduced while keeping almost the same performance.

Matching Non-Symmetric Beampatterns. Two other scenarios were simulated where the region of interest was not symmetric. The conventional method for such problems is to synthesize a covariance matrix for the symmetric version of the desired non-symmetric beampattern using EQN (4), and then shift the beampattern with an angle β to make it a desired non-symmetric beampattern as expressed by:

$$R_{Shifted}(p,q) = R_{Centered}(p,q) e^{j\pi(p-q)\sin(\beta)}.\quad(50)$$

However, using the results discussed above, the covariance matrix of complex Gaussian RVs $R_g$ can be directly minimized and used to generate QAM signals that match non-symmetric beampatterns.

Figure 9:
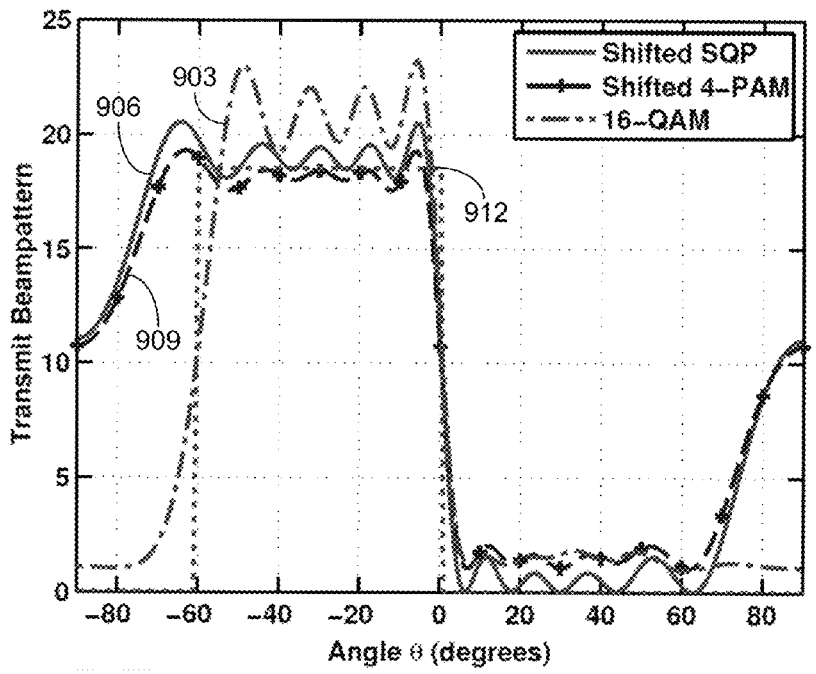

Referring to FIG. 9, shown is the performance of non-symmetric beampattern matching when the region of interest is between −60 and 0 degrees. As can be seen in FIG. 9, the transmitted power in the region of interest for the 16-QAM waveform (curve 903) is higher than both the shifted SQP waveform (curve 906) and the shifted 4-PAM waveform (curve 909). It also indicates that even if the region of interest is close to the boundary, the 16-QAM waveform (curve 903) provides a better match to the desired beampattern (curve 912), in contrast to both the shifted SQP and 4-PAM covariance matrices.

Figure 10:
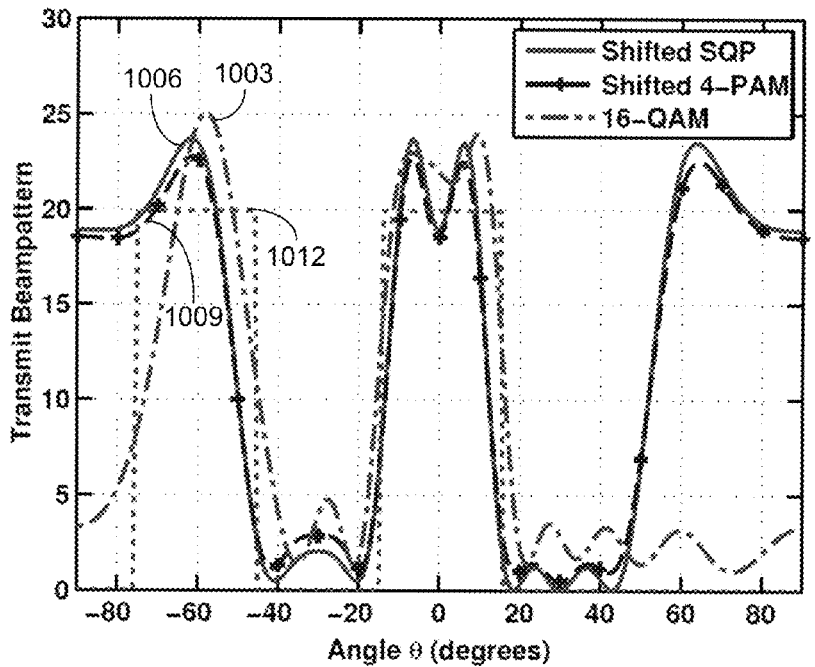

A split region of interest from −75 to −45 and from −15 to 15 degrees was examined in FIG. 10. The 16-QAM waveform (curve 1003) provides a better approximation of the desired beampattern (curve 912) than the shifted SQP waveform (curve 1006) and the shifted 4-PAM waveform (curve 1009). As shown in FIGS. 6B and 7B, the 8-PAM signals have better performance than the 4-PAM waveforms. Similarly, higher QAM signals (e.g., 64-QAM) will exhibit better performance than 16-QAM alphabets and lower the side lobes of the beampattern.

A general closed form relationship between the cross-correlation of Gaussian and finite alphabet RVs has been derived. Using different mapping functions, waveforms with different modulation schemes can be generated and the relationships between the cross-correlation of Gaussian RVs and these waveforms have been presented. QAM signals can be generated from complex Gaussian RVs which are able to directly match non-symmetric beampatterns. The validation results showed that BPSK signals were able to match the beampatterns of first order auto-regressive processes. To match more complex desired beampatterns, the PAM signals outperformed the PSK waveforms under low PAPR constraint, since their cross-correlation relationship is closer to the identity function. The case where the symbols are equiprobable was considered, where each one of them is mapped to only one region.

Figure 11:
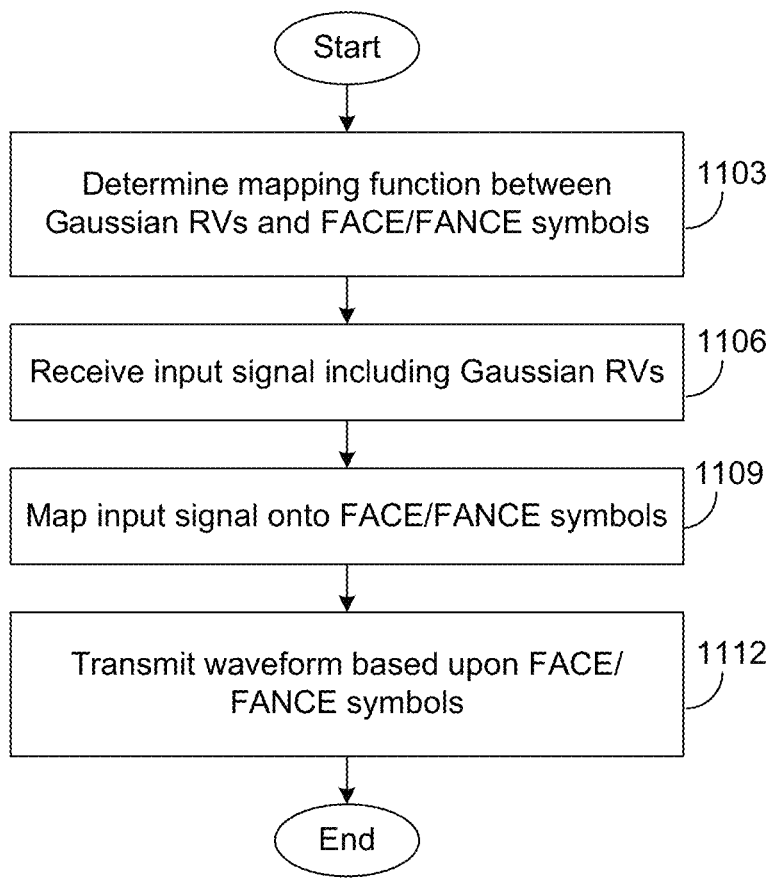
FIG. 11 is a flowchart illustrating an example of beam-patterning in accordance with various embodiments of the present disclosure.

Referring to FIG. 11, shown is a flowchart illustrating beampatterning by generating correlated finite alphabet waveforms for transmission by a uniform linear array of radar antenna elements. Beginning with 1103, a mapping function between Gaussian random variables (RVs) and finite-alphabet constant-envelope (FACE) or finite-alphabet non-constant-envelope (FANCE) symbols (or RVs) is determined as previously described. To generate equiprobable symbols, the probability-density-function of Gaussian RVs can be divided into M regions of equal area. The mapping function can be determined to maximize transmitted power in a region of interest. The region of interest to form the desired beampattern $\phi(\theta)$ can be defined by location $\theta_k$. The region of interest may be a single continuous region or may be split into two or more sub-regions. The region of interest may be symmetric or non-symmetric.

At 1106, an input signal including Gaussian RVs. The Gaussian RVs of the input signal are mapped onto FACE or FANCE symbols using the determined mapping function at 1109. For example, real Gaussian RVs can be mapped onto M-PAM (e.g., 4-PAM or 8-PAM) waveforms to generate FANCE waveforms and complex Gaussian RVs can be mapped onto M-QAM (e.g., 16-QAM or 64-QAM) waveforms, which can approximate the non-symmetric beampatterns. As can be understood, other forms of M-PAM or o M-QAM waveforms can be mapped. At 1112, a FACE or FANCE waveform can be transmitted using a uniform linear array of radar antenna elements based upon the FACE or FANCE symbols.

Figure 12:
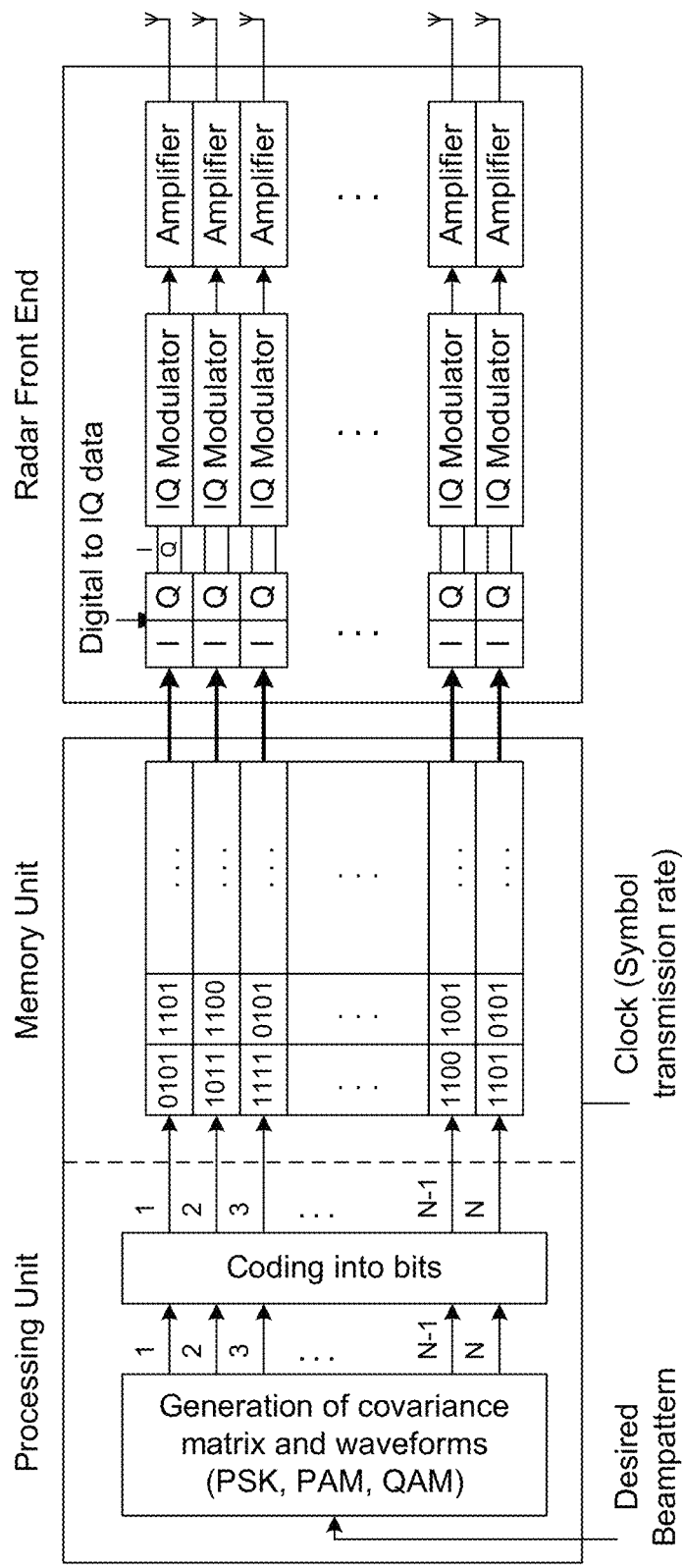
FIG. 12 is a schematic block diagram of an example of a radar system in accordance with various embodiments of the present disclosure.

Depending on the application and resources available, two types of radar systems can be designed to transmit the waveforms for the desired beampattern. Referring to FIG. 12, shown is a block diagram of an example of the first type of radar system. As can be seen in FIG. 12, the processing unit inside the system, which performs the following tasks:

Synthesize the covariance matrix for the input desired beampattern. The desired beampattern will be a vector of one and zeros, with the total number of elements in the vector defining the grid points of spatial locations. In the vector of FIG. 12, a one ("1") indicates that power is desired at that location and a zero ("0") indicates that power is not desired at that location.

To realize the covariance matrix, design the actual m-QAM or m-PAM waveforms.

Code the m-QAM or m-PAM symbols of the waveform into the corresponding digital bits stream.

Each coded bit stream is fed into the corresponding storage unit, where depending on the modulation scheme, each bit stream is converted into an IQ (in-phase/quadrature) data stream. For example, for 16-QAM, FIG. 12 shows a pair of 4 bits in the bit stream. Finally, IQ data is modulated, amplified, and transmitted at the symbol transmission rate from the corresponding antenna. In the radar system of FIG. 12, the beampattern can also be changed adaptively. Since this radar system includes its own processing unit, it can be expensive. However, beampatterns can be designed in real time.

In the second type of radar system, the synthesis of covariance matrix, design of waveforms, and coding of symbols into digital bit stream can be performed off-line. Therefore, in this second type of radar system a processing unit is not included, only the memory and clock units are utilized. This can significantly reduce the cost of the radar. The off-lined calculated digital bit streams can be input into the memory unit of this second type of radar, while all the remaining operation will remain same as described in the first type of radar. A disadvantage of this radar system is that the beampatterns cannot be changed in real time.

Figure 13:
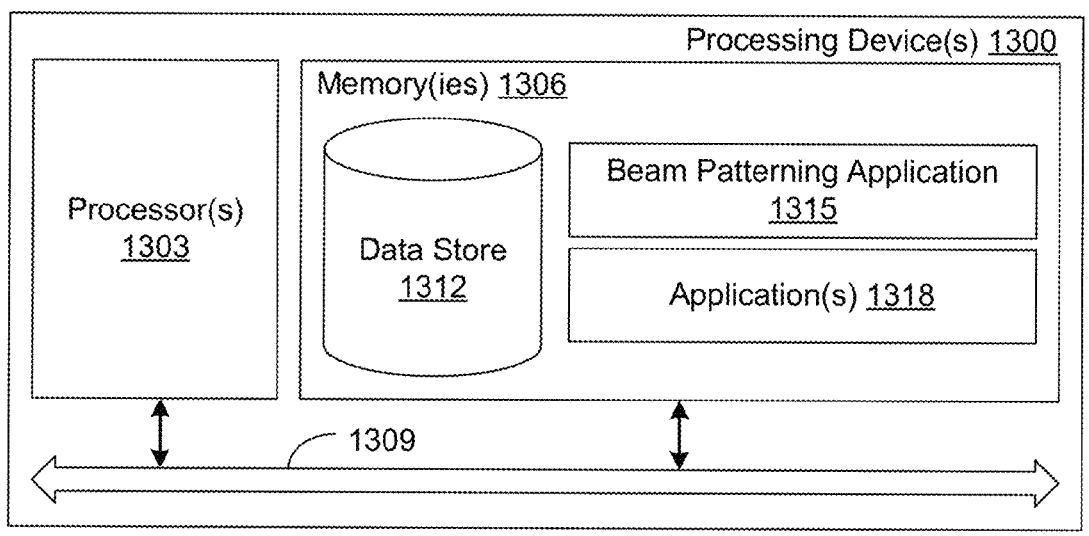
FIG. 13 is a schematic block diagram of a processing device in accordance with various embodiments of the present disclosure.

With reference to FIG. 13, shown is a schematic block diagram of a processing device 1300 according to various embodiments of the present disclosure. The processing device 1300 includes at least one processor circuit, for example, having a processor 1303 and a memory 1306, both of which are coupled to a local interface 1309. To this end, the processing device 1300 can comprise, for example, at least one computer or like device, which may be used to control radar transmissions. The local interface 1309 can comprise, for example, a data bus with an accompanying address/control bus or other bus structure as can be appreciated.

Stored in the memory 1306 are both data and several components that are executable by the processor 1303. In particular, stored in the memory 1306 and executable by the processor 1303 may be a beampatterning application 1315 and/or other applications 1318. Also stored in the memory 1306 can be a data store 1312 and other data. In addition, an operating system can be stored in the memory 1306 and executable by the processor 1303.

It is understood that there can be other applications that are stored in the memory 1306 and are executable by the processor 1303 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1306 and are executable by the processor 1303. In this respect, the term "executable" means a program file that is in a form that can ultimately be run by the processor 1303. Examples of executable programs can be, for example, a compiled program that can be translated into machine code in a format that can be loaded into a random access portion of the memory 1306 and run by the processor 1303, source code that can be expressed in proper format such as object code that is capable of being loaded into a random access portion of the memory 1306 and executed by the processor 1303, or source code that can be interpreted by another executable program to generate instructions in a random access portion of the memory 1306 to be executed by the processor 1303, etc. An executable program can be stored in any portion or component of the memory 1306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1306 is defined herein as including both volatile and nonvolatile memory and data storage components. Volatile components are those that do not retain data values upon loss of power. Nonvolatile components are those that retain data upon a loss of power. Thus, the memory 1306 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 1303 can represent multiple processors 1303 and the memory 1306 can represent multiple memories 1306 that operate in parallel processing circuits, respectively. In such a case, the local interface 1309 can be an appropriate network that facilitates communication between any two of the multiple processors 1303, between any processor 1303 and any of the memories 1306, or between any two of the memories 1306, etc. The local interface 1309 can comprise additional systems designed to coordinate this communication, including, for example, performing load balancing. The processor 1303 can be of electrical or of some other available construction.

Although the beampatterning application 1315, application(s) 1318, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Although the flowchart of FIG. 11 shows a specific order of execution, it is understood that the order of execution may differ from that which is depicted. For example, the order of execution of two or more blocks may be scrambled relative to the order shown. Also, two or more blocks shown in succession in FIG. 11 may be executed concurrently or with partial concurrence. Further, in some embodiments, one or more of the blocks shown in FIG. 11 may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the patterning application 1315 and/or application(s) 1318, that comprises software or code can be embodied in any non-transitory computer-readable medium for use by or in connection with an instruction execution system such as, for example, a processor 1303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
mapping, with a processing device, an input signal comprising Gaussian random variables (RVs) onto finite-alphabet non-constant-envelope (FANCE) symbols using a predetermined mapping function, wherein a relationship between cross-correlation coefficients of the Gaussian RVs ($\rho_{pq}$) and the corresponding mapping onto the FANCE symbols ($\Psi_{pq}$) is given by $$\psi_{pq} = F(\rho_{pq}) = \frac{2}{\pi} \sum_{n=0}^{+\infty} \frac{\rho_{pq}^{2n+1}(|2n-1|)!!}{(2n+1)(2n)!!} \left| \sum_{m=1}^{M/2} s_m(\alpha_n(\alpha_{m-1}) - \alpha_n(\alpha_m)) \right|^2$$

where $\alpha_n(\alpha_m)$ is a Kummer confluent hypergeometric function for delimiters $\alpha_m$ for M regions of the FANCE symbols; and
transmitting FANCE waveforms through a uniform linear array of radar antenna elements to obtain a corresponding beampattern, the FANCE waveforms based upon the mapping of the Gaussian RVs onto the FANCE symbols.

2. The method of claim 1, wherein the mapping is based upon M equiprobable regions of the Gaussian RVs.

3. The method of claim 2, wherein the FANCE symbols correspond to M-PAM (pulse-amplitude modulation) symbols.

4. The method of claim 1, wherein the Gaussian RVs are complex Gaussian RVs.

5. The method of claim 4, wherein the FANCE symbols correspond to M-QAM (quadrature-amplitude modulation) symbols.

6. The method of claim 1, wherein the predetermined mapping function is based at least in part upon a covariance matrix corresponding to the corresponding beampattern.

7. A system, comprising:
a processing unit comprising encoding circuitry, where the processing unit is configured to map an input signal comprising Gaussian random variables (RVs) onto finite-alphabet non-constant-envelope (FANCE) symbols using a predetermined mapping function;
a memory unit comprising memory, where the memory unit is configured to store a plurality of digital bit streams corresponding to the FANCE symbols synthesized by the processing unit; and
a front end unit comprising IQ modulators and amplifiers, where the front end unit is configured to transmit FANCE waveforms through a uniform linear array of antenna elements to obtain a corresponding beampattern, the FANCE waveforms based upon the mapping of the Gaussian RVs onto the FANCE symbols.

8. The system of claim 7, wherein the mapping is based upon M equiprobable regions of the Gaussian RVs.

9. The system of claim 8, wherein the FANCE symbols correspond to M-PAM (pulse-amplitude modulation) symbols.

10. The system of claim 7, wherein the Gaussian RVs are complex Gaussian RVs.

11. The system of claim 10, wherein the FANCE symbols correspond to M-QAM (quadrature-amplitude modulation) symbols.

12. The system of claim 7, wherein the predetermined mapping function is based at least in part upon a covariance matrix corresponding to the corresponding beampattern.

13. The system of claim 12, wherein the processing unit is configured to synthesize the covariance matrix corresponding to the corresponding beampattern.

14. The system of claim 7, wherein the front end unit is configured to convert each bit stream of the plurality of digital bit streams into corresponding IQ data streams.

15. The system of claim 7, wherein the front end unit is a radar front end unit configured to transmit the FANCE waveforms through the uniform linear array of antenna elements, wherein the antenna elements are radar antenna elements.

16. The system of claim 7, wherein a relationship between cross-correlation coefficients of the Gaussian RVs ($\rho_{pq}$) and the corresponding mapping onto the FANCE symbols ($\Psi_{pq}$) is given by $$\psi_{pq} = F(\rho_{pq}) = \frac{2}{\pi} \sum_{n=0}^{+\infty} \frac{\rho_{pq}^{2n+1}(|2n-1|)!!}{(2n+1)(2n)!!} \left| \sum_{m=1}^{M/2} s_m(\alpha_n(\alpha_{m-1}) - \alpha_n(\alpha_m)) \right|^2$$

where $\alpha_n(\alpha_m)$ is a Kummer confluent hypergeometric function for delimiters $\alpha_m$ for M regions of the FANCE symbols.

17. A system, comprising:
means for mapping an input signal comprising Gaussian random variables (RVs) onto finite-alphabet non-constant-envelope (FANCE) symbols using a predetermined mapping function;
means for storing a plurality of digital bit streams corresponding to the FANCE symbols synthesized by the means for mapping; and
means for transmitting FANCE waveforms through a uniform linear array of antenna elements to obtain a corresponding beampattern, the FANCE waveforms based upon the mapping of the Gaussian RVs onto the FANCE symbols.

18. The system of claim 17, wherein the mapping is based upon M equiprobable regions of the Gaussian RVs.

19. The system of claim 17, wherein the predetermined mapping function is based at least in part upon a covariance matrix corresponding to the corresponding beampattern.

20. The system of claim 17, wherein a relationship between cross-correlation coefficients of the Gaussian RVs ($\rho_{pq}$) and the corresponding mapping onto the FANCE symbols ($\Psi_{pq}$) is given by $$\psi_{pq} = F(\rho_{pq}) = \frac{2}{\pi} \sum_{n=0}^{+\infty} \frac{\rho_{pq}^{2n+1}(|2n-1|)!!}{(2n+1)(2n)!!} \left| \sum_{m=1}^{M/2} s_m(\alpha_n(\alpha_{m-1}) - \alpha_n(\alpha_m)) \right|^2$$

where $\alpha_n(\alpha_m)$ is a Kummer confluent hypergeometric function for delimiters $\alpha_m$ for M regions of the FANCE symbols.

* * * * *